United States Patent
Hsiao et al.

(10) Patent No.: US 12,431,806 B2
(45) Date of Patent: Sep. 30, 2025

(54) CONTROL CIRCUIT, CONTROL METHOD AND VOLTAGE REGULATOR

(71) Applicant: Silergy Semiconductor Technology (Hangzhou) Ltd., Hangzhou (CN)

(72) Inventors: Sheng-Fu Hsiao, Hangzhou (CN); Chia-Chi Liu, Hangzhou (CN); Liwen Liu, Hangzhou (CN); Chen Zhao, Hangzhou (CN)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 794 days.

(21) Appl. No.: 17/723,843

(22) Filed: Apr. 19, 2022

(65) Prior Publication Data
US 2022/0337161 A1    Oct. 20, 2022

(30) Foreign Application Priority Data
Apr. 20, 2021 (CN) .......................... 202110423282.6

(51) Int. Cl.
*H02M 3/158* (2006.01)
*H02M 1/14* (2006.01)

(52) U.S. Cl.
CPC ........... *H02M 3/1584* (2013.01); *H02M 1/14* (2013.01)

(58) Field of Classification Search
CPC ............................ H02M 1/14; H02M 3/1584
See application file for complete search history.

(56) References Cited

U.S. PATENT DOCUMENTS

| | | | | |
|---|---|---|---|---|
| 7,268,526 | B1* | 9/2007 | Smith | H02M 3/156 323/284 |
| 7,696,734 | B2 | 4/2010 | Endo et al. | |
| 10,700,607 | B2 | 6/2020 | Chen et al. | |
| 2005/0001597 | A1* | 1/2005 | Walters | H02M 3/156 323/222 |
| 2007/0013356 | A1 | 1/2007 | Qiu et al. | |
| 2008/0129259 | A1 | 6/2008 | Endo et al. | |
| 2009/0153114 | A1 | 6/2009 | Huang | |
| 2010/0033151 | A1 | 2/2010 | Wu et al. | |

(Continued)

FOREIGN PATENT DOCUMENTS

| | | |
|---|---|---|
| CN | 101227141 A | 7/2008 |
| CN | 103248231 A | 8/2013 |

(Continued)

OTHER PUBLICATIONS

First Office Action, for Chinese Patent Application No. 202110423282. 6, dated Apr. 23, 2023, 17 pages.

(Continued)

*Primary Examiner* — Rafael O De Leon Domenech
(74) *Attorney, Agent, or Firm* — Westman, Champlin & Koehler, P.A.

(57) ABSTRACT

The present disclosure discloses a control circuit, a control method and a voltage regulator. The technical solution provided by embodiments of the present disclosure can be extended to N*M phase applications by connecting N multi-phase power converters in a voltage regulator in parallel in an interleaving manner and controlling M-phase power stage circuits in each multi-phase power converter to be connected in parallel in an interleaving manner, thereby effectively achieving multi-phase interleaving control and reducing output voltage ripples.

27 Claims, 5 Drawing Sheets

(56) References Cited

U.S. PATENT DOCUMENTS

| | | |
|---|---|---|
| 2010/0066459 A1 | 3/2010 | Ahn |
| 2011/0133704 A1 | 6/2011 | Zambetti et al. |
| 2013/0057239 A1 | 3/2013 | Kalje et al. |
| 2013/0057242 A1 | 3/2013 | Zambetti et al. |
| 2013/0293203 A1 | 11/2013 | Chen et al. |
| 2014/0217996 A1* | 8/2014 | Peker .................. H02M 3/1582 323/271 |
| 2015/0277460 A1 | 10/2015 | Liu et al. |
| 2015/0280556 A1 | 10/2015 | Bari et al. |
| 2015/0372598 A1 | 12/2015 | Akiyama et al. |
| 2016/0301303 A1 | 10/2016 | Bari et al. |
| 2018/0351458 A1 | 12/2018 | Chen et al. |

FOREIGN PATENT DOCUMENTS

| | | |
|---|---|---|
| CN | 107147289 A | 9/2017 |
| CN | 112421953 A | 2/2021 |

OTHER PUBLICATIONS

Search Report, for Chinese Patent Application No. 202110423282.6, dated Apr. 6, 2023, 7 pages.

* cited by examiner

CONTROL CIRCUIT, CONTROL METHOD AND VOLTAGE REGULATOR

CROSS-REFERENCE TO RELATED APPLICATION

This application claims priority to Chinese patent application No. 202110423282.6, filed on Apr. 20, 2021, published as CN113162411A on Jul. 23, 2021, and entitled "CONTROL CIRCUIT, CONTROL METHOD AND VOLTAGE REGULATOR", the entire content of which is incorporated by reference in its entirety.

FIELD OF THE DISCLOSURE

The present disclosure relates to power electronic technology, in particular to a control circuit, a control method and a voltage regulator.

DESCRIPTION OF THE RELATED ART

Voltage regulators are widely used in smart chips, CPU and other electronic products because of their advantages such as low voltage, high current and fast load transient response. In order to improve load transient response speed and meet requirements of large current, most voltage regulators are currently implemented by multi-phase buck converters, and at the same time constant-on-time control is applied to achieve multi-phase interleaving control on the multi-phase buck converters. In order to implementing multi-phase interleaving control, a voltage regulator according to the prior art provides a trigger signal with a predetermined phase to a power stage circuit at each phase, to control a switching cycle of the power stage circuit at the corresponding phase.

However, in this multi-phase interleaving control method, on one hand, the voltage regulator as a whole requires a large number of devices, resulting in high circuit cost; on the other hand, because the power stage circuit at each phase requires the trigger signal of the corresponding phase, making it difficult to extend the application of the voltage regulator to applications with arbitrary phase number, thereby narrowing application range.

SUMMARY OF THE DISCLOSURE

In view of this, embodiments of the present disclosure provide a control circuit, a control method and a voltage regulator. By connecting N multi-phase power converters in a voltage regulator in parallel in an interleaving manner, arbitrary phase interleaving control can be realized.

According to a first aspect of the present disclosure, provided is a control circuit for a multi-phase power converter including M-phase power stage circuits, the control circuit comprises:
  a pulse distributor, configured to generate M trigger signals;
  M on-time generators, configured to respectively receive the M trigger signals to generate M switch control signals, so as to respectively control the M-phase power stage circuits; and
  A phase locked loop, configured to control a first one of the M switch control signals, which is used to control a first phase power stage circuit of the M-phase power stage circuits, to have same frequency and phase as a reference frequency signal, so as to regulate all of the M switch control signals to have a same frequency as a frequency of the reference frequency signal.

In an embodiment, a phase difference between the M trigger signals is $360°/M$.

In an embodiment, the phase locked loop is configured to generate an on-time reference signal based on a reference signal representing a desired output voltage of the multi-phase power converter and the reference frequency signal, wherein each of the on-time generators is configured to generate a corresponding one of the M switch control signals according to the on-time reference signal.

In an embodiment, the on-time reference signal has a same variation trend as the reference signal and an opposite variation trend to the reference frequency signal.

In an embodiment, the on-time generator is configured to control turn-on time of a power switch in a corresponding one of the M-phase power stage circuits to have a same variation trend as the on-time reference signal and an opposite variation trend to both of an input voltage of the multi-phase power converter and the reference frequency signal.

In an embodiment, the on-time generator is configured to control a duty cycle of the corresponding one of the M switch control signals to have a same variation trend as the on-time reference signal and an opposite variation trend to an input voltage of the multi-phase power converter.

In an embodiment, the on-time generator is configured to generate the corresponding one of the M switch control signals by comparing the on-time reference signal and a ramp signal, wherein a rising slope of the ramp signal has a same variation trend as an input voltage of the multi-phase power converter and the reference frequency.

In an embodiment, the phase locked loop is configured to control a charge pump current generated by an internal charge pump based on the reference signal and the reference frequency signal, so as to generate the on-time reference signal having a same variation trend as the reference signal and an opposite variation trend to the reference frequency signal.

In an embodiment, the control circuit further comprises a bias circuit for providing a bias signal to the phase locked loop, to control the first one of the M switch control signals to have same frequency and phase as the reference frequency signal.

In an embodiment, the control circuit further comprises:
  an on-time controller configured to generate an on-time control signal according to a load change, wherein the pulse distributor is configured to generate the M trigger signals according to the on-time control signal.

In an embodiment, the on-time controller is configured to generate the on-time control signal based on a reference signal representing a desired output voltage of the multi-phase power converter and a sampled signal of an inductor current in each one of the M-phase power stage circuits.

According to a second aspect of embodiments of the present disclosure, provided is a voltage regulator comprising:
  N multi-phase power converters configured to receive an input voltage at an input terminal and generate an output voltage, which is provided to a load, at an output terminal, each of the N multi-phase power converters including M-phase power stage circuits connected in parallel with each other,
  wherein the voltage regulator comprises N*M phase power stage circuits, and a phase difference between N*M phase power stage circuits is $360°/(N*M)$.

In an embodiment, each of the N multi-phase power converters comprises a control circuit configured to generate M switch control signals, so as to respectively control the M-phase power stage circuits, wherein the control circuit comprises a phase locked loop, and each of the phase locked loops in the N multi-phase power converters receives a corresponding reference frequency signal, and the N reference signals have the same frequency and a phase difference between the N reference frequency signals is 360°/(N*M).

In an embodiment, the control circuit further comprises:
a pulse distributor, configured to generate M trigger signals; and
M on-time generators, configured to respectively receive the M trigger signals to generate the M switch control signals, so as to respectively control the M-phase power stage circuits, wherein the phase locked loop is configured to control a first one of the M switch control signals, which corresponds to a first phase power stage circuit of the M-phase power stage circuits, to have same frequency and phase as a first reference frequency signal, so as to regulate all of the M switch control signals to have a same frequency as a frequency of the first reference frequency signal.

In an embodiment, a phase difference between the M trigger signals is 360°/M.

In an embodiment, the phase locked loop is configured to generate an on-time reference signal based on a reference signal representing a desired output voltage of the multi-phase power converter and the first reference frequency signal, wherein each of the on-time generators is configured to generate a corresponding one of the M switch control signals according to the on-time reference signal.

In an embodiment, the on-time reference signal has a same variation trend as the reference signal and an opposite variation trend to the first reference frequency signal.

In an embodiment, the on-time generator is configured to control turn-on time of a power switch in a corresponding one of the M-phase power stage circuits to have a same variation trend as the on-time reference signal and an opposite variation trend to both of an input voltage of the multi-phase power converter and the first reference frequency signal.

In an embodiment, the on-time generator is configured to control a duty cycle of the corresponding one of the M switch control signals to have a same variation trend as the on-time reference signal and an opposite variation trend to the input voltage of the multi-phase power converter.

In an embodiment, the phase locked loop is configured to control a charge pump current generated by an internal charge pump based on the reference signal and the first reference frequency signal, so as to generate the on-time reference signal having a same variation trend as the reference signal and an opposite variation trend to the first reference frequency signal.

In an embodiment, the control circuit further comprises a bias circuit for providing a bias signal to the phase locked loop, to control the first one of the M switch control signals to have same frequency and phase as the first reference frequency signal.

In an embodiment, the control circuit further comprises:
an on-time controller configured to generate an on-time control signal according to a load change, wherein the pulse distributor is configured to generate the M trigger signals according to the on-time control signal.

According to a third aspect of embodiments of the present disclosure, provided is a control method for a multi-phase power converter including M-phase power stage circuits, wherein the control method comprises:
generating M trigger signals;
generating M switch control signals according to the M trigger signals, so as to respectively control the M-phase power stage circuits; and
controlling a first one of the M switch control signals, which corresponds to a first one of the M-phase power stage circuits, to have same frequency and phase as a reference frequency signal, so as to regulate all of the M switch control signals have a same frequency as the reference frequency signal.

In an embodiment, a phase difference between the M trigger signals is 360°/M.

In an embodiment, the control method further comprises generating an on-time reference signal based on a reference signal representing a desired output voltage of the multi-phase power converter and the reference frequency signal, and generating a corresponding one of the M switch control signals according to the on-time reference signal.

In an embodiment, the on-time reference signal has a same variation trend as the reference signal and an opposite variation trend to the reference frequency signal.

In an embodiment, the control method further comprises controlling turn-on time of a power switch in a corresponding one of the M-phase power stage circuits to have a same variation trend as the on-time reference signal and an opposite variation trend to both of an input voltage of the multi-phase power converter and the reference frequency signal.

In an embodiment, the control method further comprises controlling a duty cycle of the corresponding one of the M switch control signals to have a same variation trend as the on-time reference signal and an opposite variation trend to the input voltage of the multi-phase power converter.

In an embodiment, step of generating the corresponding one of the M switch control signals according to the on-time reference signal comprises:
comparing the on-time reference signal and a ramp signal to generate the corresponding one of the M switch control signals, wherein a rising slope of the ramp signal has a same variation trend as the input voltage of the multi-phase power converter and the reference frequency signal.

In an embodiment, the control method further comprises generating an on-time control signal according to a load change, and generating the M trigger signals according to the on-time control signal.

According to the technical solutions provided by the embodiments of the present disclosure, N multi-phase power converters in the voltage regulator are connected in parallel in an interleaving manner, and M-phase power stage circuits in each multi-phase power converter are controlled to be connected in parallel in an interleaving manner, to achieve interleaving control on power stage circuits with arbitrary phase number, thereby broadening applications of the voltage regulator, simplifying circuit design, and effectively saving application costs.

BRIEF DESCRIPTION OF THE DRAWINGS

The above and other objects, features and advantages of the present invention will become more apparent from following descriptions of embodiments of the present disclosure with reference to the accompanying drawings, in which.

DETAILED DESCRIPTION OF EMBODIMENTS OF THE DISCLOSURE

The present invention is described below based on embodiments but the present invention is not limited to these embodiments. In following detailed description of the present disclosure, some specific parts are described in detail. The present disclosure may also be fully understood by those skilled in the art without a detailed description of these details. To avoid obscuring principle aspects of the present disclosure, well known methods, procedures, flows, components and circuitry are not described in detail.

Furthermore, it will be understood by those of ordinary skill in the art that the drawings provided herein are for purposes of illustration and are not necessarily drawn to scale.

Also, it should be understood that in the following description, "circuit" refers to a conductive loop formed by at least one element or sub-circuit through an electrical or electromagnetic connection. When an element or circuit is "connected to" another element or an element/circuit is "connected between" two nodes, it may be directly coupled or connected to another element or there may be an intermediate element, and the connection between the elements may be physical, logical, or a combination thereof. Conversely, when an element is called "directly coupled to" or "directly connected to" another element, it means that there is no intermediate element between them.

Unless the context expressly requires, the words "comprising", "including" and the like throughout the description and the claims shall be construed in the meaning of inclusion and not in an exclusive or exhaustive sense. That is to say, it means "including but not limited to".

In the description of the present disclosure, it is to be understood that the terms "first", "second" and the like are used for descriptive purposes only and cannot be understood to indicate or imply relative importance. Furthermore, in the description of the present disclosure, "multiple" means two or more unless otherwise stated.

Figure 1:
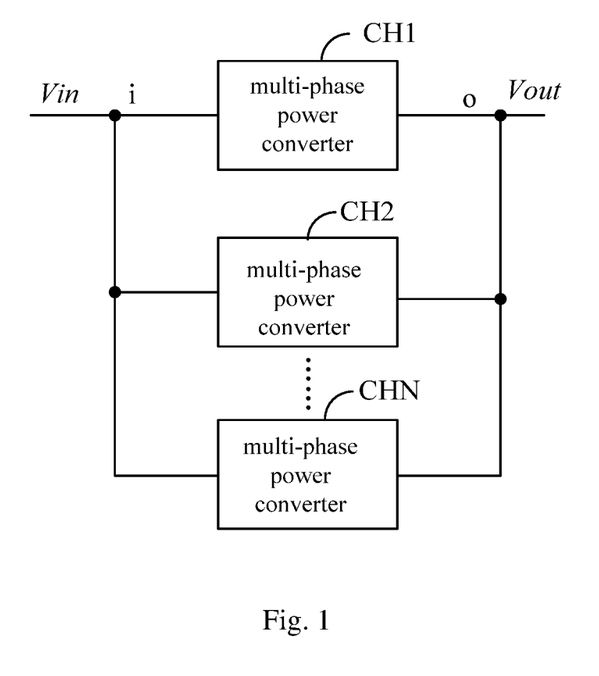
FIG. 1 is a circuit diagram of a voltage regulator according to a first embodiment of the present disclosure.

FIG. 1 is a circuit diagram of a voltage regulator according to a first embodiment of the present disclosure. As shown in FIG. 1, the voltage regulator of this embodiment comprises N multi-phase power converters CH1-CHN. The multi-phase power converters CH1-CHN receive an input voltage Vin at an input terminal i and generate an output voltage Vo, which is provided to a load, at an output terminal o.

Each multi-phase power converter comprises M-phase power stage circuits and a control circuit for controlling the M-phase power stage circuits. The control circuit is configured to generate M switch control signals to respectively control the M-phase power stage circuits. The M-phase power stage circuits are connected in parallel between the input terminal i and the output terminal o, and each phase power stage circuit includes a set of power switches, and are controlled to be turned on and off by a corresponding switch control signal, so as to regulate the output voltage Vo. In this embodiment, phase difference between the N multi-phase power converters is $360°/(N*M)$, and phase difference between the M-phase power stage circuits in each multi-phase power converter is $360°/M$, thereby effectively achieving interleaving control with the phase difference of $360°/(N*M)$ of the N*M phase power stage circuits, so as to reduce output voltage ripples.

In an embodiment, each control circuit includes a phase locked loop, and each of the phase locked loops in the N multi-phase power converters CH1-CHN receives a corresponding reference frequency signal, the N reference frequency signals have the same frequency, and a phase difference between the N reference frequency signals is $360°/N*M$, in order to realize interleaving control on the N*M phase power stage circuits.

Different from a control mode of a voltage regulator in the prior art, the embodiment of the present disclosure can be extended to the application of N*M phase power stage circuits by connecting the N multi-phase power converters in parallel in an interleaving manner and controlling the M-phase power stage circuits in each multi-phase power converter to be connected in parallel in an interleaving manner, thereby effectively achieving multi-phase interleaving control and reducing output voltage ripples.

In this control method, the reference frequency signals of N multi-phase power converters are provided by the phase locked loops, and the M-phase power stage circuits in each of the multi-phase power converters are controlled to operate with a phase difference with each other at the same time, so that the phase difference between N*M phase power stage circuits is controlled to be $360°/(N*M)$, thereby achieving interleaving control on power stage circuits with arbitrary phase number and broadening applications of the voltage regulator.

In an embodiment, the control circuit further includes a pulse distributor and M on-time generators, each of the on-time generators corresponds to a phase in a control loop of the multi-phase power stage circuit. The pulse distributor is configured to generate M trigger signals. The M on-time generators respectively receive corresponding trigger signals and generate M switch control signals with a phase difference with each other to control the corresponding phase power stage circuit in each of the multi-phase power converters. For example, a first phase power stage circuit of the M-phase power stage circuits is coupled between the input terminal i and the output terminal o of the voltage regulator, and a first switch control signal of the M switch control signals is used to control the power switches in the first phase power stage circuit in each of the multi-phase power converters to be turned on and off, so as to regular the output voltage Vo. The phase locked loop is further configured to control the first switch control signal to have same frequency and phase as the first reference frequency signal, so as to regulate all of the M switch control signals to have a same frequency as the frequency of the first reference frequency signal. The reference frequency signals respectively received by the phase locked loops in the N multi-phase power converters have the same frequency and different phases. For example, the voltage regulator in this embodiment includes two multi-phase power converters, the phase locked loop in a first one of the two multi-phase power converters controls the reference frequency signal of the current multi-phase power converter to have a phase of 0° and a first frequency, and the phase locked loop in a second one of the two multi-phase power converters controls the reference frequency signal of the current multi-phase power converter to have a phase of 30° and a frequency equal to the first frequency.

The phase locked loop (PLL) is an automatic closed-loop control circuit that can complete phase synchronization of two electrical signals, enabling an output signal to follow a phase of an input signal, and maintaining phase coincidence. The operation principle of the phase locked loop is to detect a phase difference between the input signal and the output signal, and convert a detected phase difference signal into a voltage signal through a phase/frequency detector and output the obtained voltage signal, which forms a control voltage of a voltage-controlled oscillator for controlling a frequency of an output signal of the voltage-controlled oscillator after being filtered by a charge pump and a low-pass filter, and then feed the frequency and phase of the output signal of the voltage-controlled oscillator back to the phase/frequency detector through a feedback path. In this embodiment, the phase locked loop in the control circuit can ensure that the frequency of the switch control signal of each phase power stage circuit is consistent with that of the reference frequency signal. In particular, the phase locked loop receives the reference frequency signal and the first switch control signal for controlling the first phase power stage circuit in the multi-phase power converter, and a loop is locked when the frequencies of the first switch control signal and the reference frequency signal are sufficiently close to each other, thereby ensuring that the first switch control signal and the reference frequency signal are consistent. Since only phases of the M switch control signals generated by the M on-time generators are different and the M switch control signals have identical frequencies, the phase locked loop can make the frequencies of the M switch control signals keep the same by performing frequency-locking on the first switch control signal.

In one implementation, the phase difference between the reference frequency signals received by the phase locked loops in each multi-phase power converter is 360°/N*M, and the phase difference between the trigger signals generated by the pulse distributor in each multi-phase power converter is 360°/M, so that the phase difference between the N*M phase power stage circuits can be controlled to be 360°/(N*M), so as to realize the interleaving control on the N*M phase power stage circuits and reduce the output voltage ripples.

In this embodiment, the control circuit is configured to control the switching cycle of the switch control signal by use of a cooperation of the phase locked loop and the pulse distributor, and set the duty cycle of each phase power stage circuit respectively by the M on-time generators, so as to realize the interleaving control on power stage circuits with arbitrary phase number, thereby broadening applications of the voltage regulator, simplifying the circuit design, and effectively saving application costs.

Figure 2:
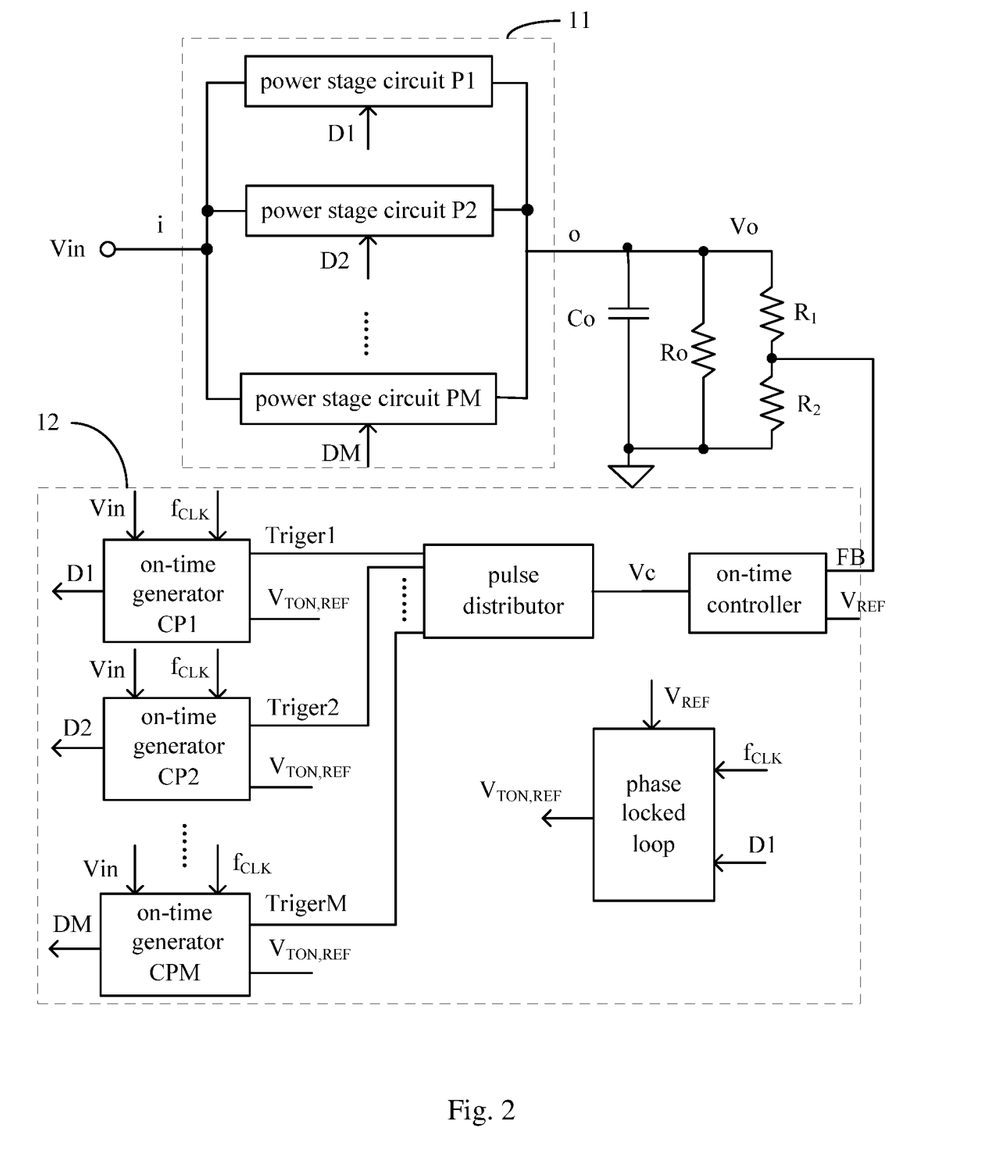
FIG. 2 is a circuit diagram of a multi-phase power converter according to an embodiment of the present disclosure.

FIG. 2 is a circuit diagram of a multi-phase power converter according to an embodiment of the present disclosure. As shown in FIG. 2, the multi-phase power converter includes a multi-phase power module 11 and a control circuit 12 for driving the multi-phase power module 11. The multi-phase power converter receives an input voltage Vin at an input terminal i and generates an output voltage Vo, which is provided to a load, at an output terminal o. In this embodiment, the multi-phase power module 11 includes M-phase power stage circuits P1-PM respectively driven by switch control signals D1-DM. Each phase power stage circuit includes a set of power switches which are turned on and off by corresponding switch control signals to regulate the output voltage Vo. For example, the first phase power stage circuit P1 is coupled between the input terminal i and the output terminal o of the multi-phase power converter, and the first switch control signal D1 is used to control the power switches in the first phase power stage circuit P1 to be turned on and off, so as to regular the output voltage Vo. An output capacitor Co is coupled to the output terminal o of the multi-phase power converter to filter the output signal, to maintain the output voltage Vo constant. The output voltage Vo is used to drive a load Ro.

In this embodiment, the control circuit 12 includes a pulse distributor, a phase locked loop and M on-time generators CP1-CPM. The pulse distributor is configured to generate M trigger signals Triger1-TrigerM with different phases. The phase locked loop is configured to receive the reference frequency signal $f_{CLK}$ and the first switch control signal D1, to control the reference frequency signal $f_{CLK}$ and the first switch control signal D1 to have same frequency and phase. In this embodiment, the on-time generators CP1-CPM respectively receive trigger signals Triger1-TrigerM and generate switch control signals D1-DM, to control the interleaving operation of corresponding phase power stage circuits. For example, a first input terminal of the first on-time generator CP1 receives the trigger signal Triger1 and generates the first switch control signal D1 at the output terminal to control the first phase power stage circuit P1. In this embodiment, the trigger signals Triger1-TrigerM are used to determine the phases of the switch control signals D1-DM, and the phase locked loop controls the other switch control signals to keep a same frequency as the reference frequency signal $f_{CLK}$ by controlling the first switch control signal D1 to be in the same frequency and phase as the reference frequency signal $f_{CLK}$.

A loop gain of the phase locked loop may be affected by the duty cycle and switching frequency of the multi-phase power stage circuit, causing the stability of the phase locked loop to become worse, which increases the difficulty of designing the loop gain of the phase locked loop. In order to improve the stability of the phase locked loop, the phase locked loop in this embodiment is configured to generate on-time reference signal $V_{TON, REF}$ according to a reference signal $V_{REF}$ representing a desired output voltage of the voltage regulator and the reference frequency signal $f_{CLK}$, and each of the on-time generators generates a corresponding switch control signal according to the on-time reference signal $V_{TON, REF}$. In an embodiment, the on-time reference signal $V_{TON, REF}$ has a same variation trend as the reference signal $V_{REF}$ representing the desired output voltage of the voltage regulator, and have an opposite variation trend to the reference frequency signal $f_{CLK}$. The on-time generators CP1-CPM receive the on-time reference signal $V_{TON, REF}$, the input voltage Vin and the reference frequency signal $f_{CLK}$, respectively, and generate switch control signals D1-DM according to the on-time reference signal $V_{TON, REF}$, the input voltage Vin and the reference frequency signal $f_{CLK}$. In one implementation, each of the on-time generators is configured to control the turn-on time of the power switch in the corresponding phase power stage circuit to have the same variation trend as the on-time reference signal $V_{TON, REF}$, and to have the opposite variation trend to the input voltage Vin and the reference frequency signal $f_{CLK}$. In another implementation, the on-time generator controls the duty cycle of the corresponding switch control signal to have the same variation trend as the on-time reference signal $V_{TON, REF}$, and to have the opposite variation trend to the input voltage Vin, that is, the on-time generator is configured to control a percentage cycle of the on-time of the power switch relative to a total switching cycle in each phase power stage. Base on this, it can be ensured that the loop gain of the phase locked loop is not affected by the duty cycle and switching frequency of the multi-phase power stage circuits, so as to reduce design difficulty of the loop gain of the phase locked loop and simplify circuit design. It will be understood that the on-time generators CP1-CPM in the present disclosure implement loop control by setting on-time of the power switch in each phase power stage, and those skilled in the art can also realize the loop control by setting off-time of the power switch in each phase power stage, and other circuit configurations capable of realizing the above functions can be used in this embodiment.

In an embodiment, the phase locked loop receives a voltage reference signal $V_{REF}$ and a reference frequency signal $f_{CLK}$, and controls an internal charge pump to generate the corresponding charge pump current according to the reference signal $V_{REF}$ and the reference frequency signal $f_{CLK}$, and the charge pump current is filtered by a low-pass filter to generate the on-time reference signal $V_{TON, REF}$, wherein the charge pump current is proportional to the reference signal $V_{REF}$ and is inversely proportional to the reference frequency signal $f_{CLK}$. It should be understood that the phase locked loop in the present disclosure generates the on-time reference signal $V_{TON, REF}$ by changing the charge pump current generated by the internal charge pump, and other circuit configurations capable of realizing the above functions can be used in this embodiment.

In this embodiment, the on-time generators CP1-CPM can be implemented by either an analog circuit or a digital circuit. In an embodiment, for example, the on-time generator is implemented by an analog circuit, the on-time generator controls the duty cycle of the corresponding switch control signal by comparing the on-time reference signal $V_{TON, REF}$ and a ramp signal, wherein a rising slope of the ramp signal is proportional to the input voltage Vin and the reference frequency signal $f_{CLK}$. Other circuit configurations capable of realizing the above functions can be used in this embodiment.

In this embodiment, the control circuit 12 further includes an on-time controller. The on-time controller is configured to feed back load variations to a control system, thereby improving load transient response speed. The pulse distributor generates multiple trigger signals in sequence in response to the on-time control signal Vc of the on-time controller. In this embodiment, the on-time controller takes the ripples on the output capacitor Co as an information carrier of a load change which can be directly feeds back to the control system. Further, the on-time controller generates an error signal based on an error between a feedback voltage FB representing the output voltage Vo and the reference signal $V_{REF}$ representing the desired output voltage. Also, the on-time controller samples the inductor current in each phase power stage circuit to generate a corresponding inductor current sampled signal, superimposes the inductor current sampled signals of each phase to generate a current sampled signal, and compares the current sampled signal with the error signal to generate an on-time control signal Vc. In this embodiment, the pulse distributor may be composed of a counter and a decoder, or may be formed by a ring counter, and other circuit configurations capable of realizing the above functions may be used in this embodiment.

The control circuit further includes a bias circuit configured to provide a bias signal to accelerate a speed of promoting the first switch control signal to have same frequency and phase as the reference frequency signal. The phase locked loop receives the bias signal, and controls the first switch control signal and the reference frequency signal to have same frequency and phase according to the bias signal, thereby reducing the loop burden of the phase locked loop and increasing the speed of promoting the first switch control signal and the reference frequency signal to have same frequency and phase. For example, the phase locked loop generates a control voltage of the voltage-controlled oscillator by superimposing the bias signal and the output signal of the internal low-pass filter, so as to control the output signal of the phase locked loop. It should be understood that the phase locked loop in this embodiment accelerates the speed of promoting the first switch control signal to have same frequency and phase as the reference frequency signal by superimposing the external bias signal and the output signal of the low-pass filter, and other circuit configurations capable of realizing the above functions can be used in this embodiment.

Figure 3:
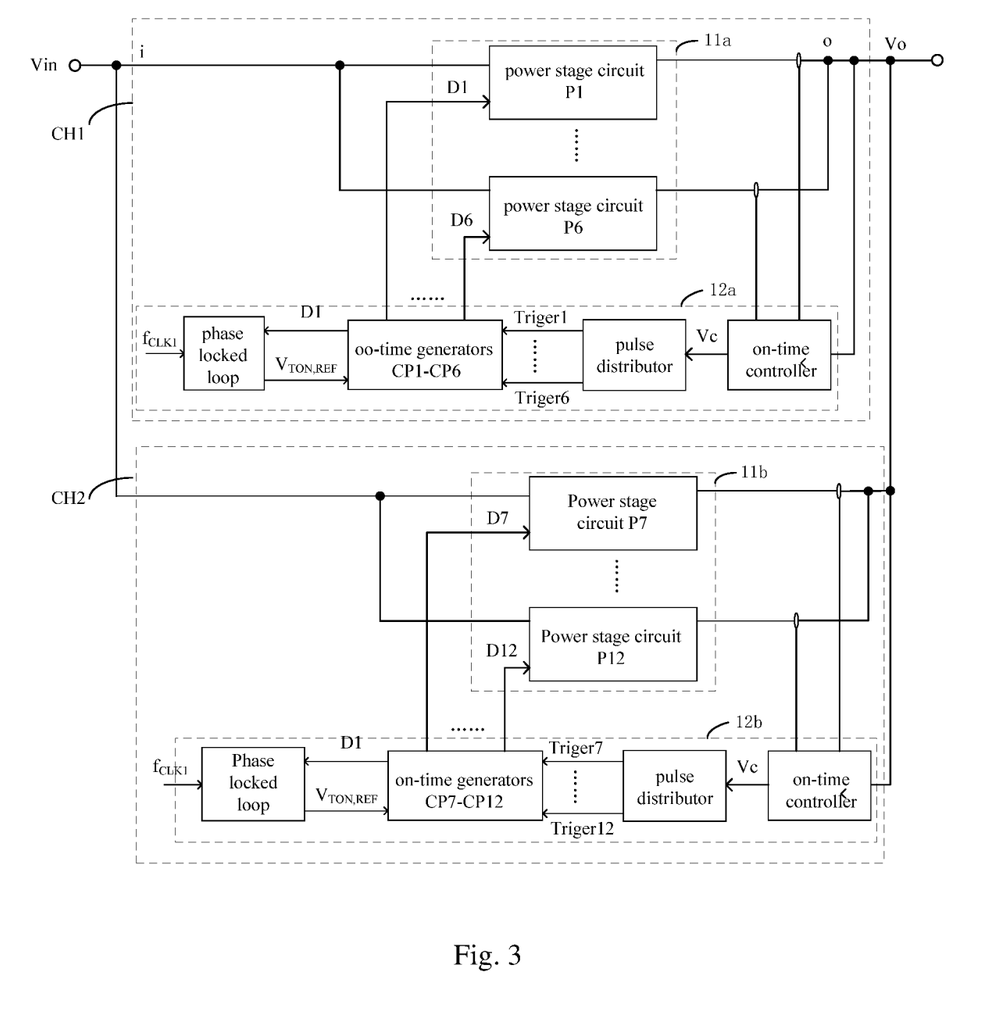
FIG. 3 is a circuit diagram of a voltage regulator according to a second embodiment of the present disclosure.

FIG. 3 is a circuit diagram of a voltage regulator according to a second embodiment of the present disclosure. As shown in FIG. 3, the voltage regulator of this embodiment includes two multi-phase power converters, respectively, i.e., a multi-phase power converter CH1 and a multi-phase power converter CH2. The multi-phase power converter CH1 includes a multi-phase power module 11a and a control circuit 12a, and the multi-phase power module 11a includes 6-phase power stage circuits P1-P6. The multi-phase power converter CH2 includes a multi-phase power module 11b and a control circuit 12b, and the multi-phase power module 11b includes 6-phase power stage circuits P7-P12. The control circuit 12a is used for generating switch control signals D1-D6 to control the power stage circuits P1-P6 in the multi-phase power module 11a. The control circuit 12b is used for generating switch control signals D7-D12 to control the power stage circuits P7-P12 in the multi-phase power module 11b, respectively. In this embodiment, the operation principle of the control circuits 12a and 12b is the same as that of the control circuits in the above embodiments and will not be described here.

In this embodiment, the phase locked loop in the control circuit 12a receives the reference frequency signal $f_{CLK1}$, and regulates the switch control signals D2-D6 to have same frequency as that of the reference frequency signal $f_{CLK1}$ by controlling the first switch control signal D1 to have same frequency and phase as the reference frequency signal $f_{CLK1}$. The phase difference between the switch control signals D1-D6 is 60°. The phase locked loop in the control circuit 12b receives the reference frequency signal $f_{CLK2}$, and regulates the switch control signals D7-D12 to have a same frequency as that of the reference frequency signal $f_{CLK2}$ by controlling the first switch control signal D7 to have same frequency and phase as the reference frequency signal $f_{CLK2}$. The phase difference between the switch control signals D7-D12 is 60°. In this embodiment, the phase of the reference frequency signal $f_{CLK1}$ is 0°, and the phase of the reference frequency signal $f_{CLK2}$ is 30°, so that the phase difference between the two multi-phase power converters is 30°, and the phase difference between the 6-phase power stage circuits in each multi-phase power converter is 60°, so as to realize the interleaving control with the phase difference of 30° between the 12-phase power stage circuits.

Figure 4:
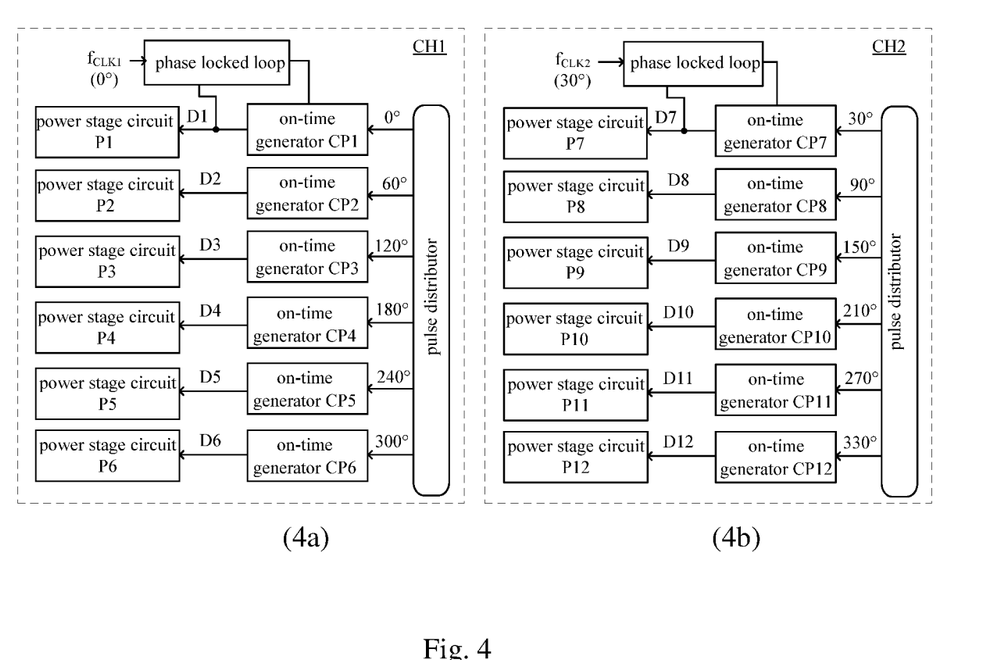
FIG. 4 is an operation timing diagram of a voltage regulator according to an embodiment of the present disclosure.

FIG. 4 is an operation timing diagram of a voltage regulator according to an embodiment of the present disclosure. As shown in FIG. 4, in case of the voltage regulator of the second embodiment in FIG. 3, the operation timing diagrams of the two multi-phase power converters are shown as FIGS. (4a) and (4b), respectively. FIG. (4a) shows the operation timing diagram of the first multi-phase power converter. FIG. (4b) shows the operation timing diagram of the second multi-phase power converter. In FIG. (4a), a phase locked loop in the first multi-phase power converter CH1 receives a reference frequency signal $f_{CLK1}$ with a phase of 0° to provide the first multi-phase power converter CH1 with a reference frequency with a phase of 0°. The pulse distributor provides trigger signals with a phase difference of 60° to the on-time generators CP1-CP6, and the on-time generators CP1-CP6 respectively generate switch control signals D1-D6 to control the power stage circuits P1-P6, thereby realizing the interleaving control with the phase difference of 60° between the 6-phase power stage circuits in the first multi-phase power converter CH1.

In FIG. (4b), a phase locked loop in the second multi-phase power converter CH2 receives a reference frequency signal $f_{CLK2}$ with a phase of 30° to provide the second multi-phase power converter CH2 with a reference frequency with a phase of 30°. The pulse distributor provides trigger signals with a phase difference of 60° to the on-time generators CP7-CP12, and the on-time generators CP7-CP12 respectively generate switch control signals D7-D12 to control the power stage circuits P7-P12, thereby realizing the interleaving control with the phase difference of 60° between the 6-phase power stage circuits in the second multi-phase power converter CH2. In this embodiment, two multi-power converters are provided with reference frequencies with different phases through the phase locked loops, and provided with trigger signals with a predetermined phase difference through the pulse distributors. In this embodiment, the voltage regulator can control 12-phase power stage circuits to realize interleaving control with a phase difference of 30°.

Figure 5:
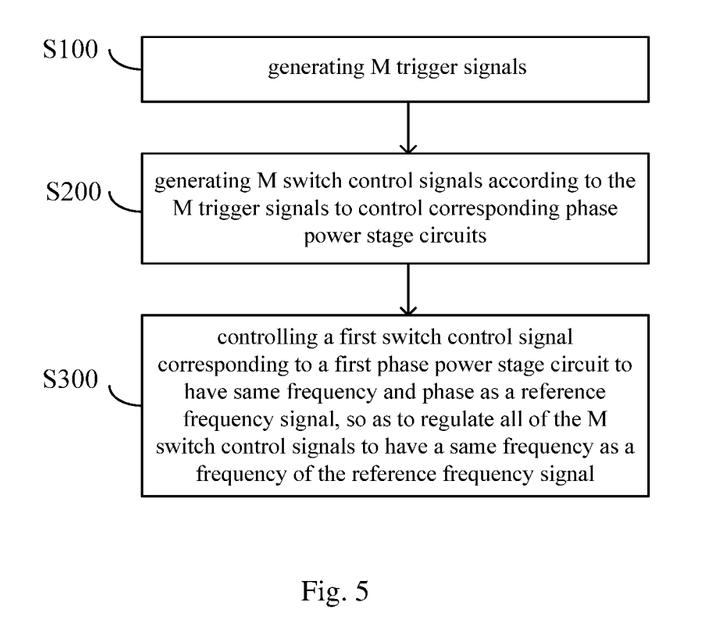
FIG. 5 is a flowchart of a control method according to an embodiment of the present disclosure.

FIG. 5 is a flowchart of a control method according to an embodiment of the present disclosure. As shown in FIG. 5, the method of this embodiment is used to control a multi-phase power converter that includes M-phase power stage circuits. The control method comprises following steps S100-S300.

In step S100, M trigger signals are generated.

In step S200, M switch control signals are generated according to the M trigger signals to control corresponding phase power stage circuits.

In step S300, a first one of the M switch control signals corresponds to a first phase power stage circuit of the M-phase power stage circuits is controlled to have same frequency and phase with the reference frequency signal, so as to regulate all of the M switch control signals to have a same frequency as that of the reference frequency signal.

Further, a phase difference between the M trigger signals is 360°/M.

Further, the control method further comprises generating an on-time reference signal based on a reference signal representing a desired output voltage of the multi-phase power converter and the reference frequency signal, and generating a corresponding one of the M switch control signals according to the on-time reference signal.

Further, the on-time reference signal has a same variation trend as the reference signal and an opposite variation trend to the reference frequency signal.

Further, the control method further comprises controlling turn-on time of a power switch in a corresponding one of the M-phase power stage circuits to have a same variation trend as the on-time reference signal and an opposite variation trend to both of an input voltage of the multi-phase power converter and the reference frequency signal.

Further, the control method further comprises controlling a duty cycle of the corresponding one of the M switch control signals to have a same variation trend as the on-time reference signal and an opposite variation trend to the input voltage of the multi-phase power converter.

Further, the step of generating the corresponding one of the M switch control signals according to the on-time reference signal includes: comparing the on-time reference signal and a ramp signal to generate the corresponding one of the M switch control signals, wherein a rising slope of the ramp signal has a same variation trend as the input voltage of the multi-phase power converter and the reference frequency signal.

Further, the control method further includes generating an on-time control signal according to a load change, and generating the M trigger signals according to the on-time control signal.

Further, the step of generating the on-time control signal according to a load change includes generating the on-time control signal according to a reference signal representing a desired output voltage of the multi-phase power converter and a sampled signal of an inductor current in each phase power stage circuit.

According to the control method in this embodiment, the switch control signals of the M-phase power stage circuits are regulated to have same frequency by controlling the switching cycle of the first one of the M switch control signals, and the duty cycle of each phase power stage circuit is set according to the M trigger signals, so as to realize the interleaving control on power stage circuits with arbitrary phase number, thereby simplifying circuit design and effectively saving application costs.

The embodiments of the present disclosure can be extended to the application of N*M phase power stage circuit by connecting N multi-phase power converters in a voltage regulator in parallel in an interleaving manner and controlling M-phase power stage circuits in each multi-phase power converter to be connected in parallel in an interleaving manner, thereby effectively achieving multi-phase interleaving control and reducing output voltage ripples.

The foregoing is merely a preferred embodiment of the present invention and is not intended to limit the present invention which may be subject to various modifications and variations to those skilled in the art. Any modification, equivalent replacement, improvement, etc. made within the spirit and principles of the present invention should be included in the scope of protection of the present invention.

What is claimed is:

1. A control circuit for a multi-phase power converter comprising M-phase power stage circuits, wherein the control circuit comprises:
   a pulse distributor, configured to generate M trigger signals;
   M on-time generators, configured to respectively receive the M trigger signals to generate M switch control signals, so as to respectively control the M-phase power stage circuits; and
   a phase locked loop, configured to control a first one of the M switch control signals, which is used to control a first phase power stage circuit of the M-phase power stage circuits, to have same frequency and phase with a reference frequency signal, so as to regulate all of the M switch control signals to have a same frequency as a frequency of the reference frequency signal,
   wherein the phase locked loop is configured to generate an on-time reference signal based on a reference signal representing a desired output voltage of the multi-phase power converter and the reference frequency signal, wherein each of the on-time generators is configured to generate a corresponding one of the M switch control signals according to the on-time reference signal.

2. The control circuit according to claim 1, wherein a phase difference between the M trigger signals is 360°/M.

3. The control circuit according to claim 1, wherein the on-time reference signal has a same variation trend as the reference signal and an opposite variation trend to the reference frequency signal.

4. The control circuit according to claim 1, wherein each of the on-time generators is configured to control turn-on time of a power switch in a corresponding one of the M-phase power stage circuits to have a same variation trend as the on-time reference signal and an opposite variation trend to both of an input voltage of the multi-phase power converter and the reference frequency signal.

5. The control circuit according to claim 1, wherein each of the on-time generators is configured to control a duty cycle of the corresponding one of the M switch control signals to have a same variation trend as the on-time reference signal and an opposite variation trend to an input voltage of the multi-phase power converter.

6. The control circuit according to claim 1, wherein the on-time generator is configured to generate the corresponding one of the M switch control signals by comparing the on-time reference signal and a ramp signal, wherein a rising slope of the ramp signal has a same variation trend as an input voltage of the multi-phase power converter and the reference frequency signal.

7. The control circuit according to claim 1, wherein the phase locked loop is configured to control a charge pump current generated by an internal charge pump based on the reference signal and the reference frequency signal, so as to generate the on-time reference signal having a same variation trend as the reference signal and an opposite variation trend to the reference frequency signal.

8. The control circuit according to claim 1, wherein the control circuit further comprises a bias circuit for providing a bias signal to the phase locked loop, to control the first one of the M switch control signals to have same frequency and phase as the reference frequency signal.

9. The control circuit according to claim 1, wherein the control circuit further comprises:
an on-time controller, configured to generate an on-time control signal according to a load change, wherein the pulse distributor is configured to generate the M trigger signals according to the on-time control signal.

10. The control circuit according to claim 9, wherein the on-time controller is configured to generate the on-time control signal based on the reference signal representing a desired output voltage of the multi-phase power converter and a sampled signal of an inductor current in each one of the M-phase power stage circuits.

11. A voltage regulator, comprising:
N multi-phase power converters, configured to receive an input voltage at an input terminal and generate an output voltage, which is provided to a load, at an output terminal, each of the N multi-phase power converters comprising M-phase power stage circuits connected in parallel with each other,
wherein the voltage regulator comprises N*M phase power stage circuits, and a phase difference between the N*M phase power stage circuits is 360°/(N*M),
wherein each of the N multi-phase power converters comprises a control circuit for generate M switch control signals, which are used to respectively control the M-phase power stage circuits,
wherein the control circuit for each of the N multi-phase power converters is configured to generate an on-time reference signal based on a reference signal representing a desired output voltage of that multi-phase power converter and a corresponding reference frequency signal, and generate a corresponding one of the M switch control signals according to the on-time reference signal.

12. The voltage regulator according to claim 11, wherein the control circuit comprises a phase locked loop, and each of the phase locked loops in the N multi-phase power converters receives the corresponding reference frequency signal, and the N reference frequency signals have the same frequency and a phase difference between the N reference frequency signals is 360°/(N*M),
wherein the phase locked loop is configured to generate the on-time reference signal based on the reference signal representing the desired output voltage of that multi-phase power converter and the corresponding reference frequency signal.

13. The voltage regulator according to claim 12, wherein the control circuit further comprises:
a pulse distributor, configured to generate M trigger signals; and
M on-time generators, configured to respectively receive the M trigger signals to generate the M switch control signals, so as to respectively control the M-phase power stage circuits, wherein the phase locked loop is configured to control a first one of the M switch control signals, which corresponds to a first phase power stage circuit of the M-phase power stage circuits to have same frequency and phase as the corresponding reference frequency signal, so as to regulate all of the M switch control signals to have a same frequency as a frequency of the corresponding reference frequency signal,
wherein each of the on-time generators is configured to generate a corresponding one of the M switch control signals according to the on-time reference signal.

14. The voltage regulator according to claim 13, wherein a phase difference between the M trigger signals is 360°/M.

15. The voltage regulator according to claim 11, wherein the on-time reference signal has a same variation trend as the reference signal and an opposite variation trend to the corresponding reference frequency signal.

16. The voltage regulator according to claim 13, wherein each of the on-time generator is configured to control turn-on time of a power switch in a corresponding one of the M-phase power stage circuits to have a same variation trend as the on-time reference signal and an opposite variation trend to both of an input voltage of the multi-phase power converter and the corresponding reference frequency signal.

17. The voltage regulator according to claim 13, wherein each of the on-time generator is configured to control a duty cycle of the corresponding one of the M switch control signals to have a same variation trend as the on-time reference signal and an opposite variation trend to an input voltage of the multi-phase power converter.

18. The voltage regulator according to claim 12, wherein the phase locked loop is configured to control a charge pump current generated by an internal charge pump based on the reference signal and the corresponding reference frequency signal, so as to generate the on-time reference signal having a same variation trend as the reference signal and an opposite variation trend to the corresponding reference frequency signal.

19. The voltage regulator according to claim 12, wherein the control circuit further comprises a bias circuit for providing a bias signal to the phase locked loop, to control the first one of the M switch control signals to have same frequency and phase as the corresponding reference frequency signal.

20. The voltage regulator according to claim 13, wherein the control circuit further comprises:
an on-time controller configured to generate an on-time control signal according to a load change, wherein the pulse distributor is configured to generate the M trigger signals according to the on-time control signal.

21. A control method for a multi-phase power converter comprising M-phase power stage circuits, wherein the control method comprises:
generating M trigger signals;
generating M switch control signals according to the M trigger signals, so as to respectively control the M-phase power stage circuits; and
controlling a first one of the M switch control signals, which corresponds to a first phase power stage circuit of the M-phase power stage circuits, to have same frequency and phase as a reference frequency signal, so as to regulate all of the M switch control signals to have a same frequency as a frequency of the reference frequency signal,
wherein the control method further comprises generating an on-time reference signal based on a reference signal representing a desired output voltage of the multi-phase power converter and the reference frequency signal, and generating a corresponding one of the M switch control signals according to the on-time reference signal.

22. The control method according to claim 21, wherein a phase difference between the M trigger signals is 360°/M.

23. The control method according to claim 21, wherein the on-time reference signal has a same variation trend as the reference signal and an opposite variation trend to the reference frequency signal.

24. The control method according to claim 21, wherein the control method further comprises:
controlling turn-on time of a power switch in a corresponding one of the M-phase power stage circuits to have a same variation trend as the on-time reference signal and an opposite variation trend to both of an input voltage of the multi-phase power converter and the reference frequency signal.

25. The control circuit according to claim 21, wherein the control method further comprises:
controlling a duty cycle of the corresponding one of the M switch control signals to have a same variation trend as the on-time reference signal and an opposite variation trend to an input voltage of the multi-phase power converter.

26. The control method according to claim 21, wherein step of generating the corresponding one of the M switch control signals according to the on-time reference signal comprises:
comparing the on-time reference signal and a ramp signal to generate the corresponding one of the M switch control signals, wherein a rising slope of the ramp signal has a same variation trend as an input voltage of the multi-phase power converter and the reference frequency signal.

27. The control method according to claim 21, wherein the control method further comprises:
generating an on-time control signal according to a load change, and generating the M trigger signals according to the on-time control signal.

* * * * *